April 11, 1950
J. F. PARKS
2,503,508
FOLDING FRAME FOR HAMMOCK SEATS AND
LIKE LOAD SUPPORTING MEMBERS
Filed April 19, 1948
4 Sheets-Sheet 4
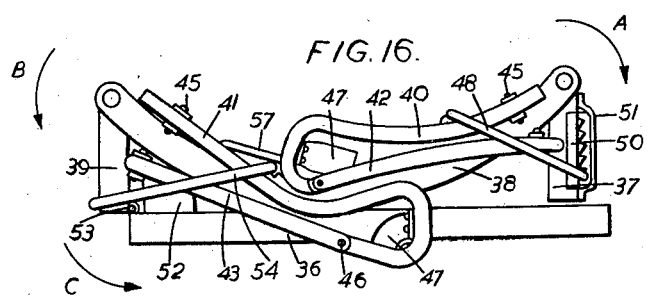
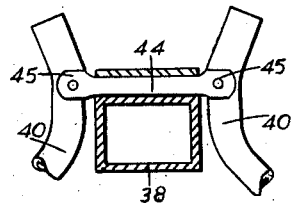
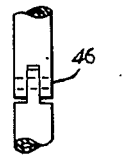
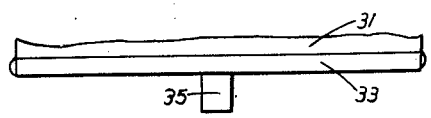
Inventor
Joseph F. Parks
By
Emery, Holcombe & Blair
Attorney Patented Apr. 11, 1950

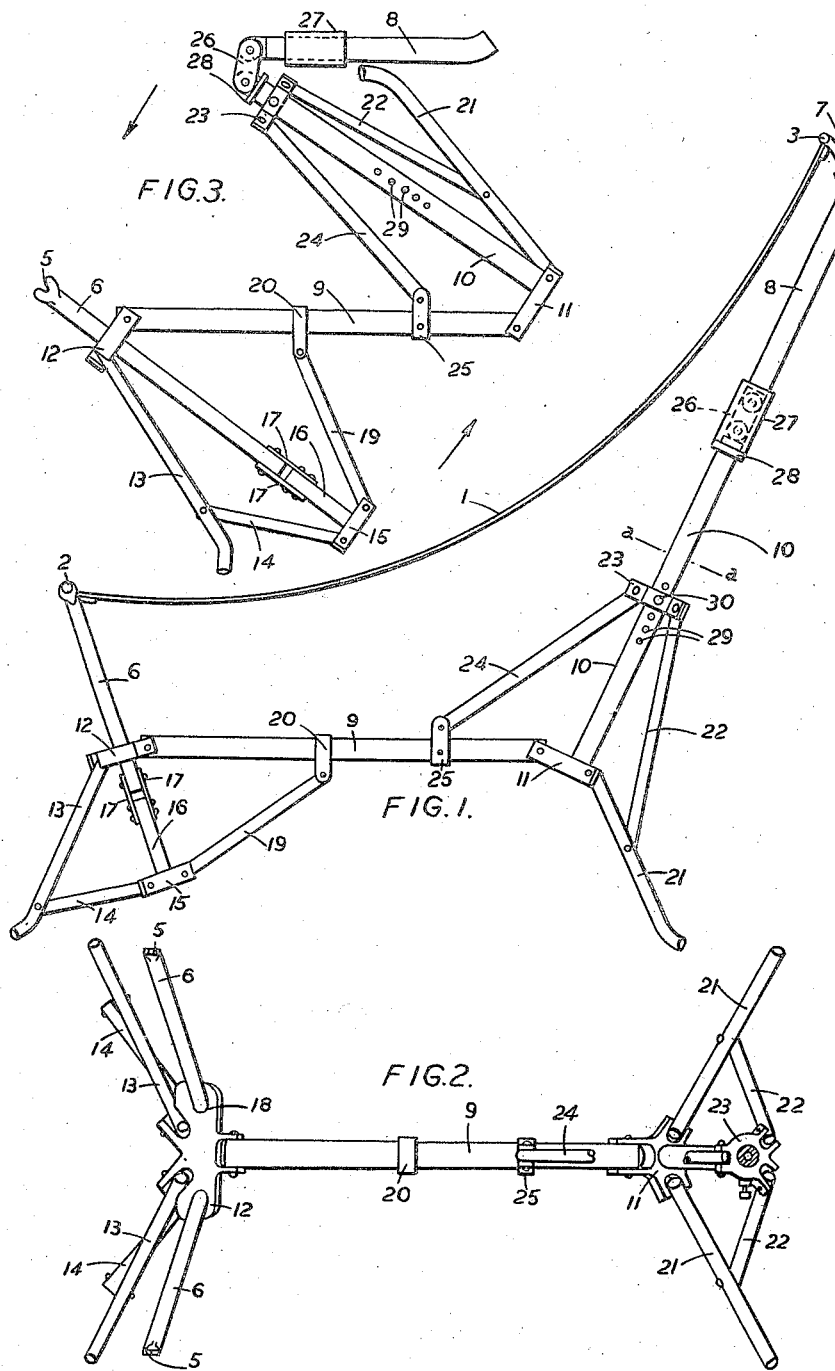

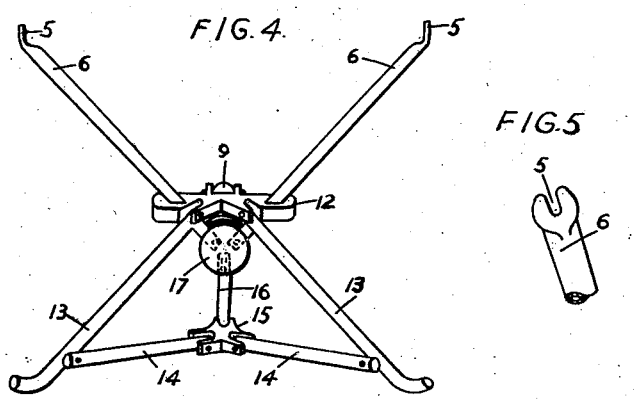

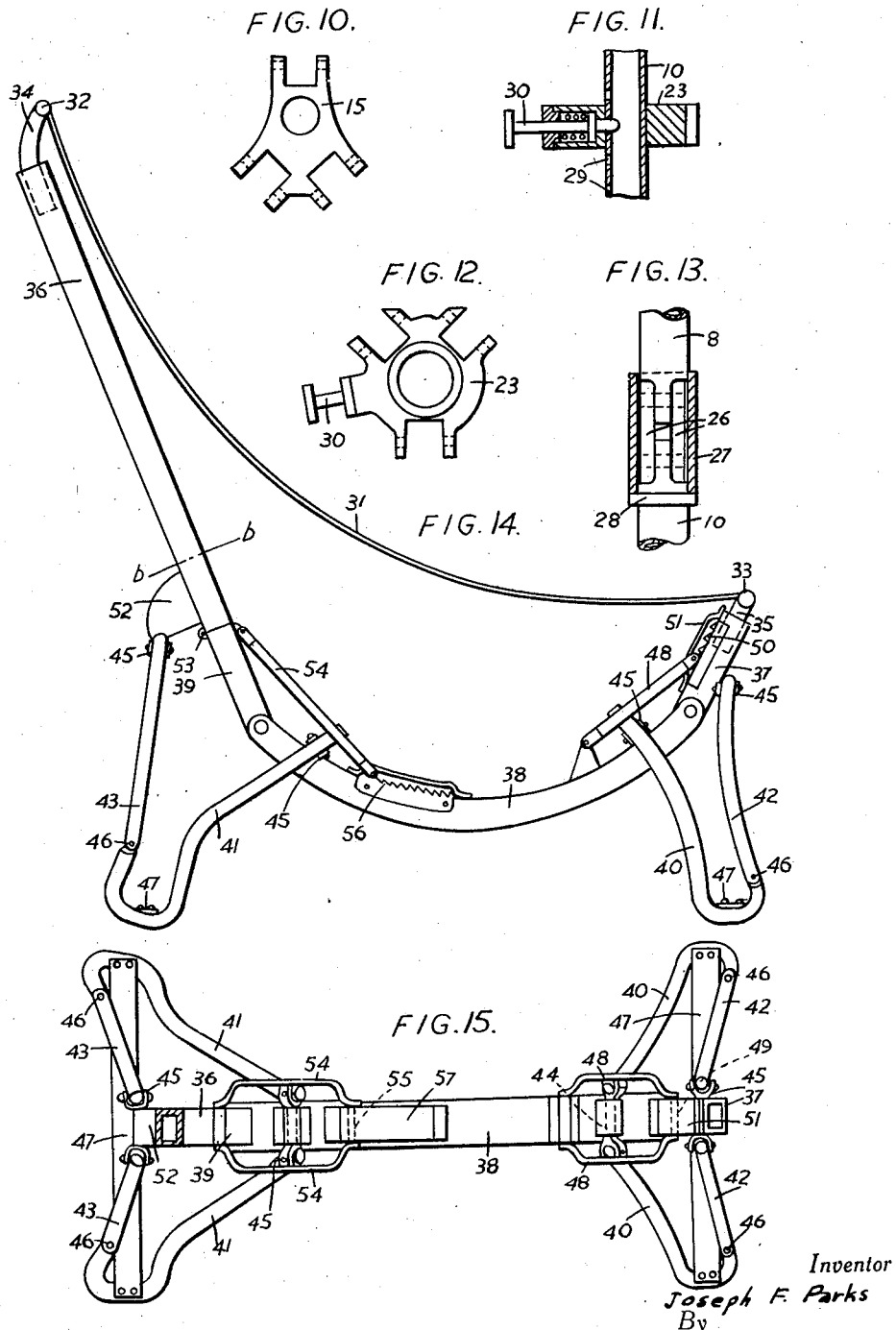

2,503,508

UNITED STATES PATENT OFFICE 2,503,508

FOLDING FRAME FOR HAMMOCK SEATS AND LIKE LOAD SUPPORTING MEMBERS

Joseph Francis Parks, Horncastle, England

Application April 19, 1948, Serial No. 21,974
In Great Britain October 29, 1946

13 Claims. (Cl. 155—139)

This invention relates to folding frames for hammock seats, for example of the deckchair type, and other load supporting members and has for one of its objects to provide an improved construction which will be satisfactory as regards strength and, if necessary, adjustability, and will further be capable of being folded into a compact and readily portable form.

A folding frame for supporting from opposite ends a hammock seat or other load carrying member according to the present invention comprises a single main frame member and front and rear supporting assemblies connected respectively to the ends of the main frame member and each including a support for one end of the load carrying member, a pair of legs, and interconnections between the support, the legs and the main frame member such that each supporting assembly can be independently folded to lie close to the main frame member or can be extended to occupy an "erected" position in which the legs extend downwardly and the support extends upwardly.

Preferably each supporting assembly is pivotally connected to the adjacent end of the main frame member and comprises a mounting member pivoted to the end of the main frame member, a load supporting member connected to the mounting member in a manner preventing pivotal movement of the supporting member relatively to the mounting member, a pair of legs pivoted to the mounting member and link mechanism controlling the movement of the legs and the pivotal movement of the mounting member relatively to the main frame member and thereby determining the position of the legs and of the mounting and load supporting members in relation to the main frame member when the supporting assemblies are in their erected positions. In such an arrangement the pivotal connections between each mounting member and the legs pivoted thereto conveniently have their axes tangential to a circle having the centre line of the adjacent load supporting member for the locus of its center whereby the legs in their folded condition lie close to the load supporting member. Further each load supporting member conveniently carries slidable longitudinally with or on it relatively to the mounting member, a coupling member (which may be adjustable) connected by links to the legs and to the main frame member, the links, the legs and the load supporting member in their folded condition lying adjacent and substantially parallel to the main frame member.

Two constructions according to the invention are illustrated by way of example in the accompanying drawings in which, Figure 1 is a view in elevation of one form of folding chair according to the invention in its erected condition, Figure 2 is a plan view of the chair shown in Figure 1 with the hammock seat removed and the rear seat-supporting member shown in section on the line a—a of Figure 1, Figure 3 is a view in elevation of the chair frame shown in Figure 1 partially folded and without the hammock seat, Figure 4 is an end elevation showing the front supporting assembly only, Figures 5, 6 and 7 are detail views showing certain features of the means for securing the hammock seat to the front and rear seat supporting members, Figures 8, 9 and 10 are plan views on an enlarged scale of the mounting members to which the legs and certain other parts are pivotally connected, Figures 11 and 12 are respectively an enlarged plan view and an enlarged sectional view of the slidable collar employed on the rear seat-supporting member, Figure 13 is a detail section view of the arrangement for locking the hinge in the rear seat supporting member, Figure 14 is a side elevation of an alternative construction of chair according to the invention, Figure 15 is a plan view of the chair shown in Figure 14 with the hammock seat removed and with the rear seat-supporting member shown in section b—b of Figure 14, Figure 16 is a side elevation showing the chair shown in Figure 14 in its folded condition with the hammock seat removed, Figure 17 is a detailed view partly in section showing the form of pivotal connection used between the leg members and the front and rear seat-supporting members in the construction shown in Figures 14 and 15, Figure 18 is a detailed view showing the form of pivotal connection between the parts of the leg members in the construction shown in Figure 14, and Figure 19 is a fragmentary view showing the arrangement of one of the spreader members used for the hammock seat in the construction shown in Figure 14.

In the construction illustrated in Figures 1 to 13 the complete chair comprises a hammock seat 1 of canvas or the like attached at its ends to two tubular spreaders 2 and 3 which are arranged to be detachably secured to the seat supporting members of the folding chair frame as indicated in Figure 1.

Thus the spreader 2 is provided as shown in Figure 7 with reduced portions 4 adjacent to its ends adapted to fit into slots 5 formed in the upper ends of front seat-supporting arms 6 as is most clearly shown in Figures 4 and 5.

The spreader 3 is on the other hand provided with a central tubular extension or plug 7 adapted to be a detachable force fit in the upper end of the upper part 8 of a rear seat-supporting member as indicated most clearly in Figure 1.

The folding frame comprises a substantially horizontal main tubular frame member 9 to the ends of which are pivotally connected mounting members 11 and 12. The mounting member 11 has rigidly secured to and projecting from it the lower part 10 of a seat-supporting member which in turn has pivotally connected to its upper end an upper part 8. The pivotal connection between the part 8 and the part 10 includes links 26 pivoted respectively to the adjacent ends of the parts 8 and 10 and a locking sleeve 27 which can be slid over the links as indicated in Figures 1 and 13 so as to hold the parts 8 and 10 in alignment when desired.

Also pivotally connected to the mounting member 11 are two legs 21, the axes of the pivots connecting the frame member 9 and the legs 21 to the mounting member 11 being inclined to one another as shown at angles of 120° and lying in the same plane. Mounted to slide upon the lower part 10 of the rear seat-supporting member is a collar 23 provided with a spring controlled locking pin 30 adapted to engage any one of a number of holes 29 in the part 10 so as to lock the collar to the part 10 in any one of a number of desired longitudinal positions. The collar 30 is connected by links 22 to each of the legs 21 and by a similar link 24 to a clip or lug 25 rigid with the main frame member 9. It will be seen that the links 22 and 24 are of approximately the same length and that the pivots connecting the links 22 to the legs are approximately the same distance from the pivots connecting the legs to the member 11 as are the pivots connecting the link 24 to the member 25 from the pivot connecting the member 9 to the mounting member 11.

The mounting member 12 has pivotally connected to it two legs 13, the axes of the pivots and of the pivot connecting the member 12 to the member 9 being in the same plane and inclined at approximately 120° to one another. Connected to the legs 13 by links 14 and to a lug 20 rigid with the member 9 by links 19 is a coupling member 15 which is rigidly secured to the lower end portion 16 of a seat-supporting member comprising in addition to the lower end portion 16 a pair of arms 6 pivoted to a pair of plates 17 secured to the upper end of the portion 16. The two arms 6 are pivoted on parallel axes and pass through slots 18 in the mounting member 12 which are spaced apart by a greater distance than the pivots connecting the lower ends of the arms 6 to the portion 16 so that, when the portion 16 moves towards the mounting member 12, the arms 6 slide through the slots 18 and their outer ends move apart. Thus the member 16 and the arms 6 together form the front seat-supporting member for the hammock seat 1.

As will be seen when the chair is in its erected condition as shown in Figures 1 and 2, the legs 21 and 13 are held in the appropriate position respectively by the locking of the collar 30 to the member 10 and by the fact that the portion 16 is held from further movement towards the mounting member 12, for example by engagement therewith. At the same time the locking of the collar 23 to the member 10 holds the rear seat-supporting member 8—10 in the required angular position, this position being adjustable however, by withdrawing the pin 30 from one hole, sliding the collar 23 along the member 10 and causing the pin 30 to engage another hole. Such adjustment also causes a small corresponding adjustment of the legs 21.

When the chair is to be folded the hammock seat 1 is detached therefrom by withdrawing the member 7 from the member 8 and detaching the spreader 2 from the slots 5. The collar 27 is then slid upwards, enabling the upper part 8 of the seat-supporting member 8—10 to be rocked backwards as indicated in Figure 3. The pin 30 is also withdrawn and the collar 23 is slid upwards beyond the holes 29, while the legs 13 are folded towards the member 9 to bring the parts into the position indicated in Figure 3 and finally into their fully folded position in which the links 24, the legs 21 and the parts 8 and 10 lie on one side of and approximately parallel to the member 9 while the links 19 and 14 and the parts 16 and 6 and the legs 13 lie on the other side of the member 9 and substantially parallel thereto. The folded frame may then be wrapped in the hammock seat 1 for transport or storage.

In an alternative arrangement the upper part of the tube 8 might be arranged to telescope within the lower part 10.

In the alternative construction illustrated in Figures 14 to 19 the chair comprises a hammock seat 31 attached at its ends to tubular spreaders 32 and 33 provided with central extensions 34, 35, for example of rectangular cross section, adapted to fit with a light force fit into the ends of seat-supporting members 36, 37 as shown in Figure 14.

The rear seat-supporting member 36 is pivotally connected by a hinge 53 to a lower supporting member 39 which in turn is hinged to the rear end of a main frame member 38, to the front end of which a front seat-supporting member 37 is hinged. Associated with the front end of the frame 38 is a leg assembly comprising two legs each including parts 40, 42 pivoted to one another at 46 about an axis parallel to the hinge connecting the members 38 and 37 and pivotally connected for universal movement at their upper ends respectively to the members 38 and 37. As shown the pivotal connections between the ends of the parts 40 and 42, and the members 38 and 37, respectively, each comprise a pin 44 mounted in a bearing on the member 38 or 37 and having forked ends 45 to which the ends of the parts 40 or 42 are pivotally connected. Thus the parts 40 have universal pivotal movement relatively to the member 38 while the parts 42 have universal pivotal movement relatively to the member 37.

A fabric or like flexible tension member 47 extends between the ground engaging parts of the legs 40, 42 to limit their separation from one another.

The member 37 is locked against pivotal movement relatively to the member 38 when the chair is erected by means of twin links 48 pivoted at one end to the member 38 and carrying a pin 49 at their other ends arranged to engage ratchet teeth 50 on the member 37, the pin 49 being held in proximity to the ratchet teeth 50 by a guide plate 51.

The rear legs comprise parts 41, 43 pivoted together at 46 and united by a tension member 47, the part 41 being connected to the member 38 and the part 43 being connected to a lug or bracket 52 on the member 36 in a similar manner to that in which the part 40 is connected to the member 38 and the part 42 is connected to the member 37. The rear supporting member 36—39 is held in any one of a number of desired angular erected positions by twin links 54 pivoted thereto and carrying a pin 55 engaging ratchet teeth 56 secured to the member 38 and having a guide plate 57 to hold the pin 55 in proximity to the teeth.

It will be seen that in its erected state the chair is capable of adjustment by altering the position of the pin 55 on the ratchet teeth 56 and/or the position of the pin 49 on the ratchet teeth 50.

When the frame is to be folded the members 33 and 34 are withdrawn from the members 37 and 36. The pin 55 connecting the links 54 is then raised clear of the ratchet teeth 56 so that the parts 39 and 36 can be folded in the direction of the arrows B and C in Figure 16 into the position shown in that figure. Similarly by lifting the pin 49 from the ratchet teeth 50 the member 37 can be rocked in the direction of the arrow A into the position shown in Figure 16. During these movements owing to the interaction of the links 54 with the leg members 41 the legs 41, 43 are swung inwards into a position approximately parallel to one another while, owing to the relative movement of the members 36 and 39 the leg members 41, 43 are brought into the position shown in Figure 16. Similarly the links 48 interact with the leg members 40 to bring them together and the pivotal movement of the member 37 relatively to the member 38 brings the leg members 40, 42 into the position shown in Figure 16. Thus a compact folded assembly is provided which if desired can be wrapped in the hammock seat 31.

What I claim as my invention and desire to secure by Letters Patent is:

1. A folding frame for supporting from opposite ends a hammock seat or similar load carrying member comprising a single main frame and front and rear supporting assemblies each adapted to support one end of the load carrying member disposed respectively at the ends of the main frame, at least one of said assemblies comprising a support pivoted to an end of said main frame and a pair of legs, and interconnections between said support, legs and main frame permitting said supporting assembly to be independently folded to lie close to the main frame and extended to occupy an erect position in which the legs project downwardly from the main frame with their extremities spread apart and the support extends upwardy from the main frame.

2. A folding frame for supporting from opposite ends a hammock seat or other load carrying member comprising a single main frame member and supporting assemblies pivotally connected to opposite ends of the main frame member and each comprising a mounting member pivoted to the end of the main frame member, a load supporting member connected to the mounting in a manner preventing pivotal movement of the supporting member relatively to the mounting member, a pair of legs movable with respect to the main frame member and pivoted to the mounting member to fold together, and link mechanism controlling the movement of the legs and the pivotal movement of the mounting relatively to the main frame member and thereby determining the position of the legs and of the mounting and load supporting members in relation to the main frame member when the supporting assemblies are in their erected positions.

3. A folding frame for supporting from opposite ends a hammock seat or other load carrying member as claimed in claim 2, in which the pivotal connections between each mounting member and the legs pivoted thereto have their axes tangential to a circle having the centre line of the adjacent load-supporting member for axis whereby the legs in their folded condition lie close to the load supporting member.

4. A folding frame for supporting from opposite ends a hammock seat or other load carrying member as claimed in claim 3, in which each load supporting member carries slidable longitudinally with or on it relatively to the mounting member, a coupling member connected by links to the legs and to the main frame member, the links, the legs and the load supporting member in their folded condition lying adjacent and substantially parallel to the main frame member.

5. A folding frame for supporting from opposite ends a hammock seat or other load carrying member comprising a main frame member and supporting assemblies connected to its opposite ends and each comprising a mounting member, two legs, pivots connecting the mounting member to the legs and to the end of the main frame member and inclined to one another but lying in the same plane, a load supporting member having a main longitudinal axis at right angles to the said plane and passing between the axes of the said pivots, a coupling member slidable with or along the load supporting member and links of substantially equal length connecting the coupling member respectively to the legs and to the main frame member at points in the lengths of the legs and main frame member approximately equidistant from the axes of the pivots connecting the said legs and main frame member to the mounting member.

6. A folding frame for supporting from opposite ends a hammock seat or other load carrying member as claimed in claim 5, in which the coupling member of one supporting assembly slides on the load supporting member which is rigid with its mounting member whereas the coupling member of the other supporting assembly is rigidly connected to the lower end of its load supporting member which moves relatively to and has parts which slide through its mounting member.

7. A folding frame for supporting from opposite ends a hammock seat or other load carrying member as claimed in claim 6, including means for holding the sliding coupling member from movement relatively to its load supporting member in any one of a plurality of positions.

8. A folding frame for supporting from opposite ends a hammock seat or other load carrying member as claimed in claim 5, in which the coupling member of at least one supporting assembly is rigidly connected to the lower end of its load supporting member while the load supporting member is arranged to move relatively to its mounting member and comprises a lower end portion rigid with the coupling member and two arms pivoted to the upper end of the lower end portion and slidable through apertures in the mounting member which are spaced apart by a greater distance than the pivots connecting 9. A folding supporting frame comprising a main frame member and a supporting assembly at at least one end thereof comprising a mounting member, two legs, pivots connecting the mounting member to the legs and to the adjacent end of the main frame member the pivots being inclined to one another but lying in the same plane, a load supporting member mounted to move relatively to the mounting member in a direction normal to the said plane and including parts which slide through the said member, a coupling member on the lower end of the load supporting member and links of approximately equal length connecting the coupling member to the legs and to the main frame member at points approximately equidistant from the mounting member.

10. A folding frame for supporting from opposite ends a hammock seat or other load carrying member as claimed in claim 1, in which each supporting assembly includes a supporting member pivoted to the adjacent end of the main frame about a horizontal axis and two leg units each comprising two parts pivoted to one another about an axis parallel to the pivotal axis of the supporting member adjacent to the ground engaging part of the leg and pivoted for universal movement at their other ends respectively to the main frame and to the adjacent supporting member.

11. A folding frame for supporting from opposite ends a hammock seat or other load carrying member as claimed in claim 10, in which each of the two leg units includes a flexible tension member extending between the two legs of the unit to limit their outward movement.

12. A folding frame for supporting from its opposite ends a deckchair seat or other load carrying member comprising a single main frame member or backbone and front and rear support assemblies at its ends each including a support member pivoted to the adjacent end of the frame, two legs pivoted to each support member about axes which are inclined to one another so that in an erected position their outer ends are comparatively widely separated while in their folded position their outer ends lie comparatively close together, one or more load supporting members connected to the support member so as to be incapable of pivotal movement relatively thereto and in the erected position extending upwardly from the support member, and a pivoted linkage for preventing pivotal movement of the legs under the effect of load, comprising an intermediate member pivoted to the adjacent ends of three links the opposite ends of which are connected respectively to the two legs and to an appropriate point on the frame such that when the legs are folded the links and the legs lie adjacent and substantially parallel to the frame.

13. A folding frame for supporting from opposite ends a hammock seat or similar load carrying member comprising a single main frame member and front and rear supporting assemblies pivotally connected respectively to the ends of the main frame member and each including a support for one end of the load carrying member, a pair of legs and interconnections between the support, the legs and the main frame member permitting each supporting assembly to be independently folded into a folded position and moved into an erected position and causing the legs to move into a folded position adjacent to the main frame member when the supporting member is similarly moved into its folded position adjacent to the main frame member, said interconnections similarly causing the legs to move into an erected position in which they extend downwardly from the main frame member when the supporting member is moved into an erected position in which it extends upwardly from the main frame member.

JOSEPH FRANCIS PARKS.

REFERENCES CITED

The following references are of record in the file of this patent:

UNITED STATES PATENTS

| Number | Name | Date |
|---|---|---|
| 506,776 | Ford | Oct. 17, 1893 |
| 711,579 | Morehouse | Oct. 21, 1902 |
| 2,473,090 | Becker | June 14, 1949 |